United States Patent
Koyama et al.

(10) Patent No.: US 8,224,838 B2
(45) Date of Patent: Jul. 17, 2012

(54) DATABASE SEARCH METHOD, PROGRAM, AND APPARATUS

(75) Inventors: Mie Koyama, Kawasaki (JP); Hiroaki Sugano, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 432 days.

(21) Appl. No.: 11/324,833

(22) Filed: Jan. 4, 2006

(65) Prior Publication Data

US 2007/0061316 A1    Mar. 15, 2007

(30) Foreign Application Priority Data

Sep. 9, 2005   (JP) ................. 2005-262033

(51) Int. Cl.
*G06F 17/30* (2006.01)
(52) U.S. Cl. ..................... 707/765; 715/968
(58) Field of Classification Search .............. 707/3, 4, 707/5, 102, 2, 100, 733, 779, 805, 706, 710, 707/713, 723, 731, 748, 999.004, 999.005, 707/999.102, 705, 764–767, 968, 769–770; 715/700, 780, 783, 810, 841, 243, 744, 968
See application file for complete search history.

(56) References Cited

U.S. PATENT DOCUMENTS

| | | | | |
|---|---|---|---|---|
| 6,523,026 | B1 * | 2/2003 | Gillis | 707/3 |
| 7,096,218 | B2 * | 8/2006 | Schirmer et al. | 707/5 |
| 2004/0054662 | A1 * | 3/2004 | Dworkis et al. | 707/3 |
| 2005/0080771 | A1 * | 4/2005 | Fish | 707/3 |

FOREIGN PATENT DOCUMENTS

| | | |
|---|---|---|
| JP | 7-302267 | 11/1995 |
| JP | 8-6970 | 1/1996 |
| JP | 11-265385 | 9/1999 |
| JP | 2002-24261 | 1/2002 |

* cited by examiner

*Primary Examiner* — Greta Robinson
(74) *Attorney, Agent, or Firm* — Greer, Burns & Crain, Ltd.

(57) ABSTRACT

A search condition specifying unit specifies a search condition item, and specifies a re-search condition item which is desired to be re-searched based on the search result according to the search specified condition. A search processing unit extracts an item value corresponding to the re-search condition item from the search result of the database according to the search condition item, and repeats search of a database wherein the item value serves as the search condition item until no item value is extracted. A search result display unit displays the search result according to the search processing unit in a list.

14 Claims, 12 Drawing Sheets

FIG. 4A

PART SEARCH

| SEARCH EXECUTION | CLEAR ~44 |
| --- | --- |

42

| SEARCH CONDITION SPEC | PRODUCT NO. | CA46740-0002 |
| --- | --- | --- |
| | MANUFACTURER PRODUCT NAME | |
| | MANUFACTURER BREVITY CODE | ▶ |
| | MANAGEMENT CATEGORY | ▶ |
| | STANDARDIZED RANK | |
| | UNIT PRICE | YEN |
| | SUBSTITUTIONAL PRODUCT NO. | .. |

SEARCH METHOD SPEC:
- ○ NORMAL SEARCH (32-1)
- ● TWO-STEP SEARCH (32-2)
- ○ PLURAL-STEP SEARCH (32-3)

| PRODUCT NO. | MANUFACTURER PRODUCT NAME | MANUFACTURER BREVITY CODE | MANAGEMENT CATEGORY | STANDARD RANK | UNIT PRICE | SUBSTITUTIONAL PRODUCT NO. |
|---|---|---|---|---|---|---|
| | | | | | | |
| | | | | | | |
| | | | | | | |
| | | | | | | |

| | COUNTER VALUE 48 | PRODUCT NO. 50 | MANAGEMENT CATEGORY 52 | UNIT PRICE 54 | SUBSTITUTIONAL PRODUCT NO. 56 |
|---|---|---|---|---|---|
| 58 → | 1 | CA46740-0002 | A | @15 YEN | CA46740-0020 |
| 60 → | 2 | CA46740-0020 | B | @15 YEN | CA46740-0025 |

| | COUNTER VALUE 48 | PRODUCT NO. 50 | MANAGEMENT CATEGORY 52 | UNIT PRICE 54 | SUBSTITUTIONAL PRODUCT NO. 56 |
|---|---|---|---|---|---|
| 58 → | 1 | CA46740-0002 | A | @15 YEN | CA46740-0020 |
| 60 → | 2 | CA46740-0020 | B | @15 YEN | CA46740-0025 |
| 62 → | 3 | CA46740-0025 | A | @14 YEN | CA46740-0100 |
| 64 → | 4 | CA46740-0100 | A | @13 YEN | ------ |

| PRODUCT NO. | MANAGEMENT CATEGORY | UNIT PRICE | SUBSTITUTIONAL PRODUCT NO. |
|---|---|---|---|
| 50 | 52 | 54 | 56 |
| CA46740-0002 | A | @15 YEN | CA46740-0020 |

FIG. 6D 46-1

| COUNTER VALUE | PRODUCT NO. | MANAGEMENT CATEGORY | UNIT PRICE | SUBSTITUTIONAL PRODUCT NO. |
|---|---|---|---|---|
| 48 | 50 | 52 | 54 | 56 |
| 1 | CA46740-0100 | A | @13 YEN | ------ |

Original Information 68

| PRODUCT NO. | MANAGEMENT CATEGORY | UNIT PRICE | PRO-PERTY |
|---|---|---|---|
| CA46740-0002 | A | @15YEN | XXXX |

Substitutional Product Information 70

| SUBSTITUTIONAL PRODUCT NO. | MANAGEMENT CATEGORY | UNIT PRICE | PRO-PERTY |
|---|---|---|---|
| CA46740-0020 | B | @15YEN | XXXX |

| ORIGINAL INFORMATION 68 | | | |
|---|---|---|---|
| PRODUCT NO. | MANAGEMENT CATEGORY | UNIT PRICE | PRO-PERTY |
| CA46740-0002 | A | @15YEN | XXXX |

| SUBSTITUTIONAL PRODUCT INFORMATION 70 | | | |
|---|---|---|---|
| SUBSTITUTIONAL PRODUCT NO. | MANAGEMENT CATEGORY | UNIT PRICE | PRO-PERTY |
| CA46740-0020 | B | @15YEN | XXXX |

| SUBSTITUTIONAL PRODUCT INFORMATION 72 | | | |
|---|---|---|---|
| SUBSTITUTIONAL PRODUCT NO. | MANAGEMENT CATEGORY | UNIT PRICE | PRO-PERTY |
| CA46740-0025 | A | @14YEN | XXXX |

| SUBSTITUTIONAL PRODUCT INFORMATION 74 | | | |
|---|---|---|---|
| SUBSTITUTIONAL PRODUCT NO. | MANAGEMENT CATEGORY | UNIT PRICE | PRO-PERTY |
| CA46740-0100 | A | @13YEN | XXXX |

| ORIGINAL INFORMATION 68 | | | |
|---|---|---|---|
| PRODUCT NO. | MANAGEMENT CATEGORY | UNIT PRICE | PRO-PERTY |
| CA46740-0002 | A | @15YEN | XXXX |

| SUBSTITUTIONAL PRODUCT INFORMATION 74 | | | |
|---|---|---|---|
| SUBSTITUTIONAL PRODUCT NO. | MANAGEMENT CATEGORY | UNIT PRICE | PRO-PERTY |
| CA46740-0100 | A | @13YEN | XXXX |

1

DATABASE SEARCH METHOD, PROGRAM, AND APPARATUS

This application is a priority based on prior application No. JP 2005-262033, filed Sep. 9, 2005, in Japan.

BACKGROUND OF THE INVENTION

1. Field of the Invention

The present invention relates to database search method, program, and apparatus for searching a database by specifying a search condition item(s), and particularly, relates to database search method, program, and apparatus that enable a search of plural steps with respect to a database by one search operation.

2. Description of the Related Arts

Conventionally, in search methods of a database, based on a search result according to a search condition initially specified by a user by use of a used terminal of the database, a new search condition is extracted and specified, and the search of further extracting a search condition from the extracted result is repeated, thereby obtaining necessary search results.

FIG. 1 is a conventional general search of a database; and, when a part search which is performed as, for example, part of design work or production management of a device is employed as an example, it will be as the following. Note that, the below example is specifically intended to search presence of parts serving as substitutions of a certain part (substitutional products) and the information relevant to the substitutional products. First, in step S1, a part number is input as search data and as a search condition, a search is executed in step S2, and the search result is output in step S3. For example, a substitutional product number is extracted from the search result as an item further searched as a re-search condition by the user, it is input as re-search data in step S5, re-search is executed in step S6, and the search result is output in step S7. Then, in step S8, until no re-search condition is obtained from the search result, the user repeats the process of step S4 to S7.

However, in such conventional database search methods, for example when there are substitutional products in the search results in the part search, in order to check the detailed information of the substitutional products, substitutional product numbers have to be newly subjected to data input as search conditions, wherein the operations for re-searching are repeated; therefore, the search operations have to be repeated a number of times until necessary information is obtained, and there is a problem that the operation efficiency is bad and labor hours and time are consumed. On the other hand, when the detailed information is searched by a batch search of the substitutional product numbers, the search operations are not required to be repeated; however, creation of text files of the substitutional product numbers used in the batch search takes labor hours, thereby further deteriorating the operation efficiency. Furthermore, when search operations are repeated a number of times until necessary information is obtained, the difference between the first search result and subsequent re-search results often cannot be recognized at one view, and there is a problem that it is difficult to perform the operation of determining a necessary substitutional product by comparing detailed information of substitutional products which are obtained as separate search results.

SUMMARY OF THE INVENTION

According to the present invention is to provide database search method, program, and apparatus that enable an efficient search operation in which search results of plural steps with respect to an item desired to be further searched upon search can be automatically obtained by one search operation without the need of operation of re-searches.

(Method)

The present invention provides a database search method. The database search method of the present invention is characterized by comprising a search condition specifying step of specifying a search condition item, and specifying a re-search condition item for performing re-search based on a search result according to specification of the search condition item;

a search processing step of extracting an item value corresponding to the re-search condition item from the search result of a database according to specification of the search condition item, and repeating a search of the database wherein the item value serves as a new search condition item until no item value is extracted; and a search result display step of displaying the search results obtained in the search processing step in a list.

Herein, in the search condition specifying step, further, a search type corresponding to the number of search steps is specified, and a display type of the search results is specified. Also, in the search condition specifying step, an arbitrary-plural-step search of two-step search or a search having more than two steps is specified as the search method.

Each of the search results obtained in a plural-step search in the search processing step is comprised of plural items; and the search result display step performs all-item all-row combination listing display in which, based on specification of a display type in the search condition specifying step, all the items of each of the search results according to the plural-step search are disposed in a row direction, and the search results in which all the items are disposed in rows are disposed in a column direction in a searched order.

Also, in the search result display step, based on specification of the display type in the search condition specifying step performed is all-item one-row combination listing display in which all the items of each of the search results according to the plural-step search are disposed in the row direction in the searched order.

In this case, in the search result display step performed is specified-item one-row combination listing display in which, based on specification of a display type and a display item in the search condition specifying step, the specified display item is extracted from the search results obtained in the plural-step search, and disposed in a row direction in a searched order. Also, in the search result display step performed may be specified-item one-row combination listing display in which, based on specification of a display type and a display item in the search condition specifying step, the specified display item is extracted from the initially searched search result and the final search result after the plural-step search, and disposed in a row direction in a searched order.

In the database search method of the present invention, for example, in the search condition specifying step, a product is specified as the search condition item, and a substitutional product is specified as the re-search condition item;

in the search processing step, a substitutional product is extracted from the search result according to specification of the product, and a search in which the substitutional product serves as a new search condition item is repeated until no substitutional product is extracted from the search result; and, in the search result display step, the product and the substitutional product searched in the search processing step are displayed in the list.

Also, the database search method of the present invention is characterized by searching a database based on a specified item;

determining whether information corresponding to a re-search item which has been specified in advance is included or not in the search result; and, if the re-search item information is included, re-searching the database by use of the re-inspection item information.

Furthermore, the database search method of the present invention is characterized by searching a database based on a specified item;

re-searching the database by use of information included in the search result; and displaying the initially searched search result and the search result finally obtained by the re-search in a row.

(Program)

The present invention provides a database search program. The database search program of the present invention is characterized by causing a computer to execute a database search method characterized by comprising a search condition specifying step of specifying a search condition item, and specifying a re-search condition item for performing re-search based on a search result according to specification of the search condition item;

a search processing step of extracting an item value corresponding to the re-search condition item from the search result of a database according to specification of the search condition item, and repeating a search of the database wherein the item value serves as a new search condition item until no item value is extracted; and a search result display step of displaying the search results obtained in the search processing step in a list.

(Apparatus)

The present invention provides a database search apparatus. The database search apparatus of the present invention is characterized by comprising a search condition specifying unit for specifying a search condition item, and specifying a re-search condition item for performing re-search based on a search result according to specification of the search condition item;

a search processing unit for extracting an item value corresponding to the re-search condition item from the search result of a database according to specification of the search condition item, and repeating a search of the database wherein the item value serves as a new search condition item until no item value is extracted; and a search result display unit for displaying the search results according to specification of the search processing unit in a list.

Note that details of the database search program and apparatus are basically same as the case of the database search method according to the present invention.

According to the present invention, when a re-search condition item with respect to a search result is specified in an initial search, re-searches are automatically repeated until no item value of the re-search condition item is extracted from the search result, or until it reaches a specified search step number, wherein the operations of inputting search data for re-searches are not required; therefore, necessary search result obtained in a plural-step search can be obtained by one search operation, and efficiency of the search operation can be improved. In addition, when plural search results obtained in a plural-step search by specifying a re-search condition item are displayed in a list in which the search results are listed in combination, the difference between the search results can be recognized at one view; and, for example in a part search, a part can be efficiently selected from the list display of the search results. In the present invention, selection of all-item all-row combination listing display or specified-item one-row combination listing display can be specified as the list display in which the search results are listed in combination; and, particularly, in the specified-item one-row combination listing display, an item such as price required by the user to be comparatively displayed can be specified among plural items included in the search results, thereby providing customized list display, wherein part selection focused on prices can be efficiently performed. Also, when, as the specified-item one-row combination listing display, an initially searched search result and a final search result after a plural-step search are listed in combination in one row by comparative display items which has been specified in advance, the latest information can be obtained by one search operation, and the operation efficiency can be improved. The above and other objects, features, and advantages of the present invention will become more apparent from the following detailed description with reference to the drawings.

BRIEF DESCRIPTION OF THE DRAWINGS

FIGS. 4A and 4B are explanatory drawings of a search operation screen for part search used in the present invention;

FIG. 5 is an explanatory drawing of an internal configuration of the database of FIG. 2;

FIGS. 6A to 6D are explanatory drawings of all-item all-row combination listing display of the search results obtained by specifying a two-step search and a plural-step search of the present invention;

FIGS. 7A to 7C are explanatory drawings of specified-item one-row combination listing display of the search results obtained by specifying the two-step search and the plural-step search of the present invention;

DETAILED DESCRIPTION OF THE PREFERRED EMBODIMENTS

Figure 1:
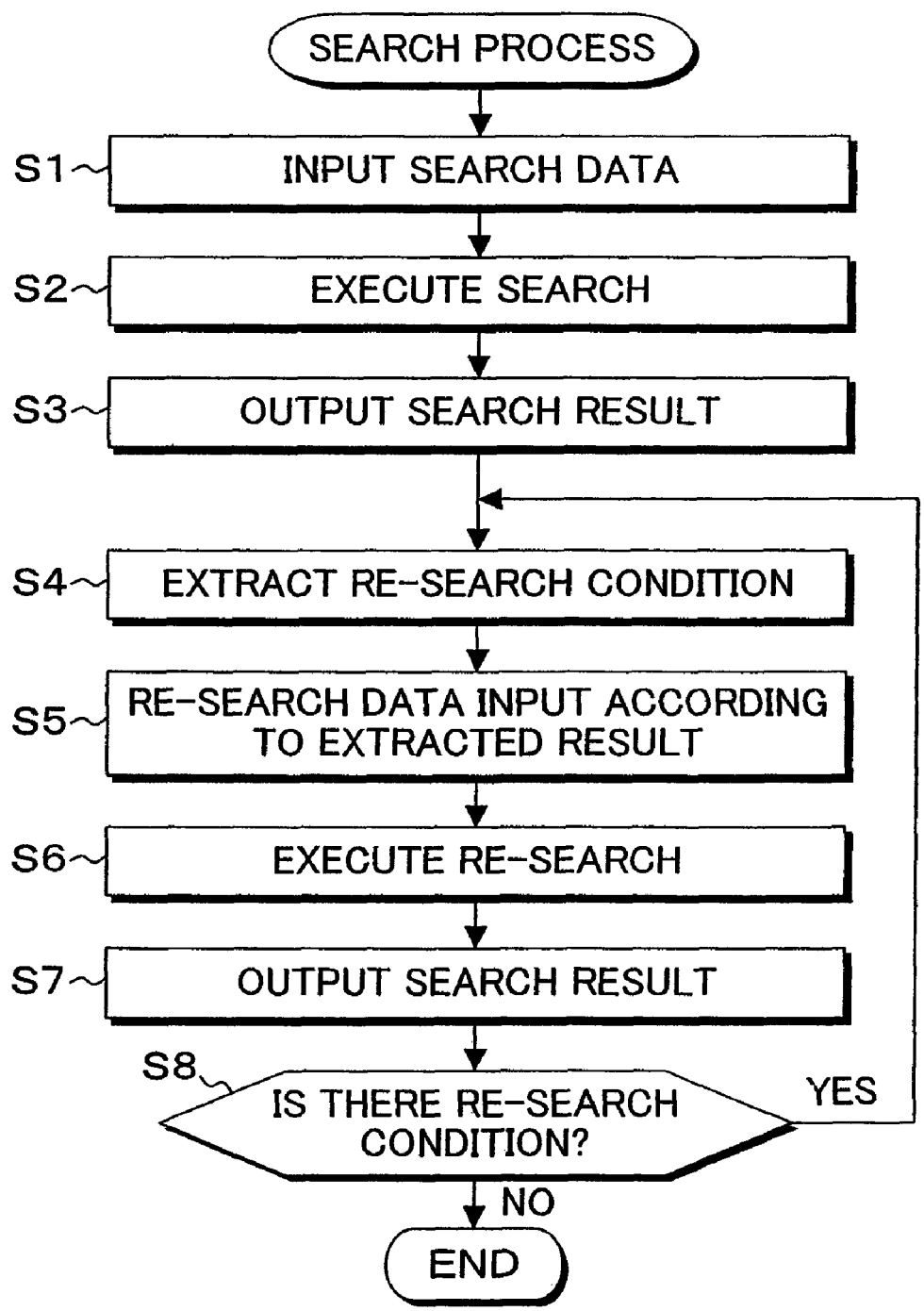
FIG. 1 is a flow chart showing a procedure of a conventional database search.
Figure 2:
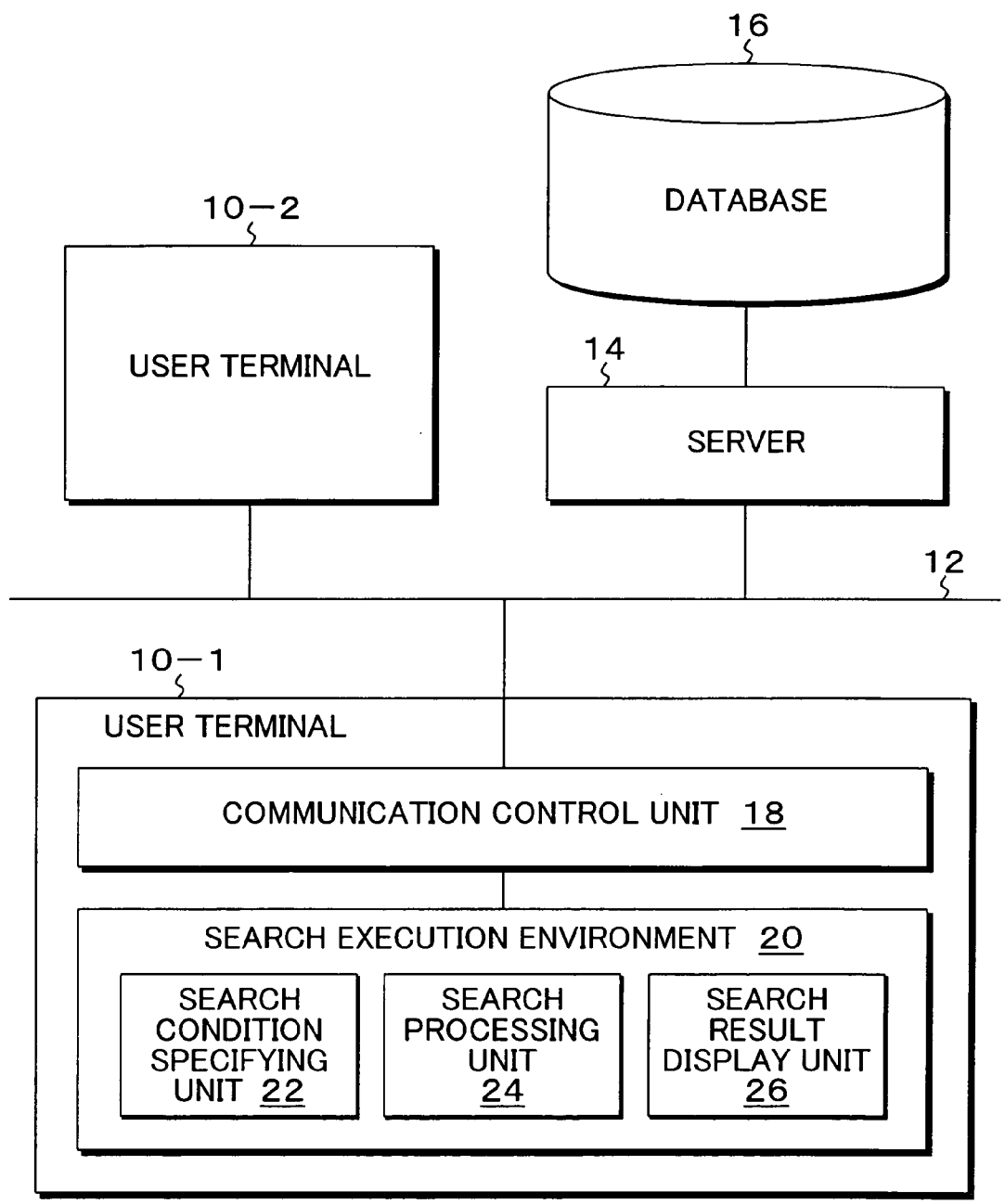
FIG. 2 is a block diagram of a functional configuration of a database search system according to the present invention.

FIG. 2 is a block diagram of a functional configuration of a database search system according to an embodiment of the present invention. In FIG. 2, in the database search system of this embodiment, user terminals 10-1, 10-2 are connected to a server 14 which manages a database 16 via a network 12 such as a LAN. A program of this embodiment which executes database search processes of this embodiment is installed in the user terminals 10-1, 10-2, and the functions shown in the user terminal 10-1 are realized by this program. The user terminal 10-1 is provided with a communication control unit 18 and a search execution environment 20, and the functions of a search condition specifying unit 22, a search processing unit 24, and a search result display unit 26 realized by the database search program of this embodiment are realized in the search execution environment 20. The search condition specifying unit 22 specifies search condition items necessary for database searches. Particularly, when a plural-step search according to this embodiment is to be performed, it specifies search condition items which are necessary for an initial search, and specifies a re-search condition item which is to be re-searched based on the result of the initial search. The search processing unit 24 executes processes of database searches. Particularly, when a plural-step search according to this embodiment is to be performed, and when an item value(s) (value) corresponding to the re-search condition item specified by the search condition specifying unit 22 is also returned from the initial search result of the database 16 according to the search condition item(s) specified by the search condition specifying unit 22, it extracts this, and executes a re-search process of the database by use of the extracted item. Then, until no item value corresponding to the re-search condition item is extracted from the search result, or until the number of search steps reaches a specified number, a search of the database 16 is repeated while setting the item value extracted from the search result as the next search condition item of a re-search.

Herein, in the search condition specifying unit 22 of this embodiment, any one among
(1) normal search,
(2) two-step search, and
(3) plural-step search (the number of search steps is three or more)
is specified as a search method executed by the search processing unit 24. In a normal search, the search processing unit 24 terminates a search process with one search of the database 16 wherein merely a search item is specified. In a two-step search, when an item value corresponding to a re-search condition item is returned from an initial search result of the database, the search processing unit 24 repeats re-search of the database while using the item value as the search condition item of the next search, and terminates the search process with the initial search and the second re-search. Furthermore, when the plural-step search is specified, until no item value corresponding to the re-search condition item is returned and extracted from the result of database search, the search processing unit repeats search of the database while using the item value of the re-search condition item extracted from the search result as a next search condition item. The search result display unit 26 executes a process of displaying the search results according to the search processing unit 24. When the plural-step search according to this embodiment is executed, the search results according to a two-step search or a search of a plurality of steps more than two steps is displayed in a list. For displaying the list of the search results by the search result display unit 26, any display method among
(1) all-item all-row combination listing display,
(2) specified-item one-row combination listing display, and
(3) specified-item one-row combination listing display (original information search result and final search result)
can be specified by the search condition specifying unit 22, and the search result display unit 26 displays the list of the search results in accordance with the specified display method. Note that the display method is not limited to those described above, and can be appropriately changed depending on the use of the search results. Herein, in the "all-item all-row combination listing display" of (1), with respect to search results of a plural-step search which is comprised of a plurality of items, all items of each search result are disposed in the row direction, and the search results in which all the items are disposed in the row direction are disposed in the column direction in the searched order. In other words, the search results searched by plural steps are comprised of records of plural items, and the all-item all-row combination listing display has a display configuration in which the records of these search results are disposed in the column direction in the searched order. This embodiment employs a method in which all of the search results obtained in the search steps of the plural-step search are displayed in the column direction. In contrast, in the "specified-item one-row combination listing display" of (2), merely the display items specified by a user by the search condition specifying unit 22 are extracted from the search results and displayed. More specifically, the specified-item one-row combination listing display is a display configuration in which specified display items are extracted from the search results according to a plural-step search, and disposed in the row direction in the searched order. Moreover, in the "specified-item one-row combination listing display (original information search result and final search result)" of (3), the search result which has been initially searched and the final search result after a plural-step search are listed in combination in one row by comparative display items which have been specified in advance. Consequently, latest information can be obtained by one search operation, and operation efficiency can be improved. The all-item all-row combination listing display and the specified-item one-row combination listing display will be further elucidated in later description.

Figure 3:
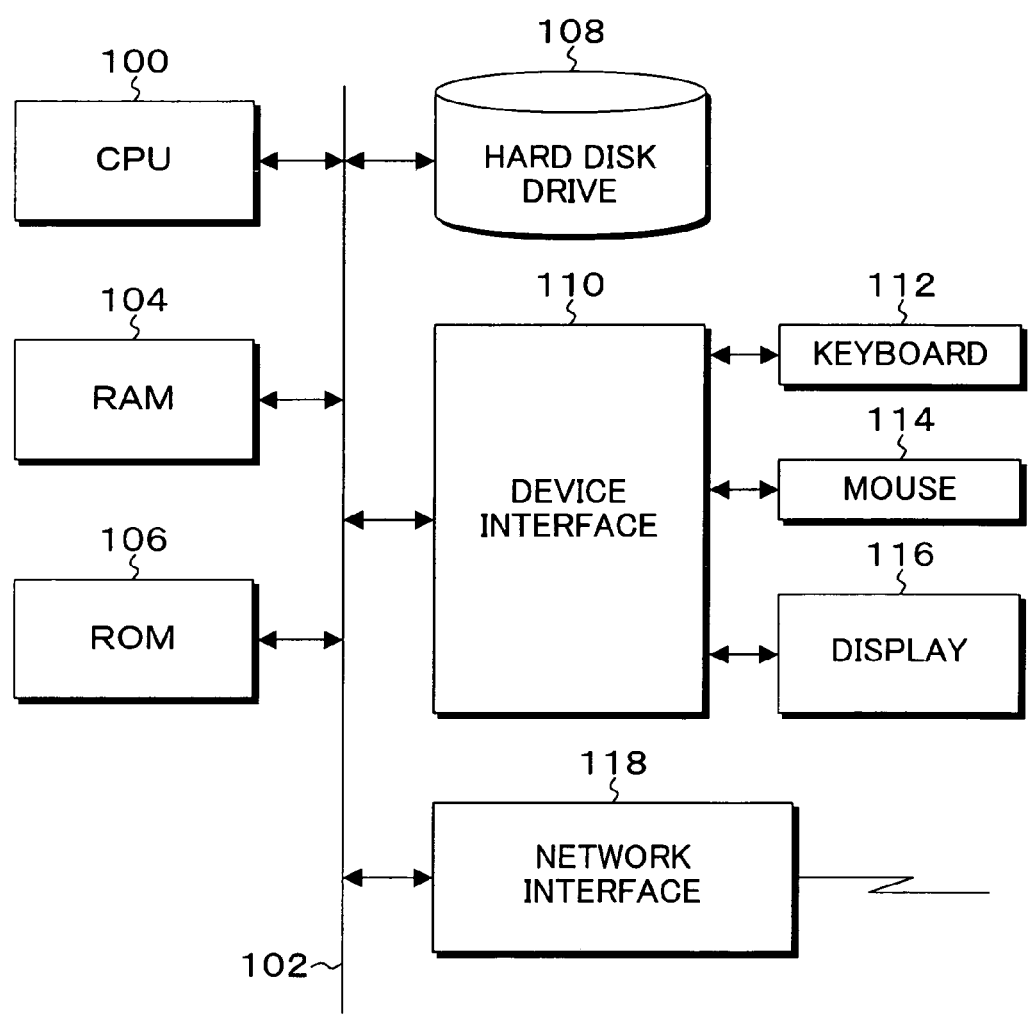
FIG. 3 is a block diagram of a hardware configuration of a computer constituting the user terminal of FIG. 2.

FIG. 3 is a block diagram of a hardware configuration of a computer constituting the user terminal of FIG. 2. In FIG. 3, the computer has a CPU 100; wherein to a bus 102 of the CPU 100 connected are a RAM 104, a ROM 106, a hard disk drive 108, a device interface 110 to which a keyboard 112, a mouse 114, and a display 116 are connected, and a network interface 118. The database search program of this embodiment is installed in the hard disk drive 108, and is read out from the hard disk drive 108 to the RAM 104 so as to be deployed when the computer is started up; and this is executed by the CPU 100. Note that the recording medium for recording the database search program is not limited to that described above, and the database search program may be recorded in a portable-type recording medium such as a CD-ROM.

Figure 4B:
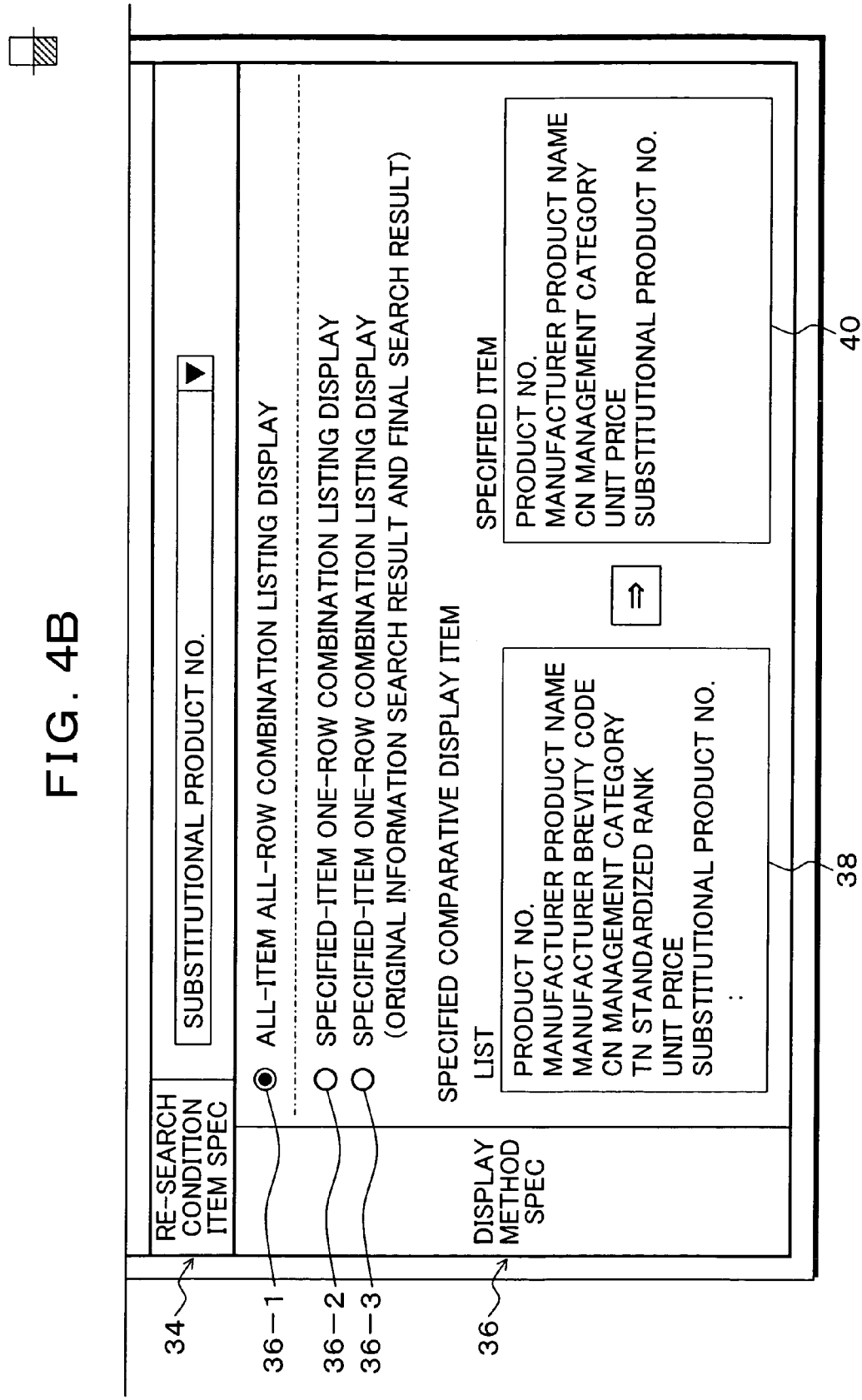

FIGS. 4A and 4B are an explanatory drawings of a search operation screen used in this embodiment, which is illustrated by employing a part search as an example. In FIGS. 4A and 4B, a search condition setting unit 30, a search method specifying unit 32, a re-search condition item specifying unit 34, and a display method specifying unit 36 are provided in a search operation screen 28; and when a search process is to be performed, search conditions, etc. are input by use of the search operation screen 28 displayed in a display. The search condition setting unit 30 is a field in which search condition items used in an initial search are specified. Since a part search is employed as an example in this example, items of:
(1) product number,
(2) manufacturer product name,
(3) manufacturer brevity code,
(4) management category,
(5) standard rank,
(6) unit price, and
(7) substitutional product number
are shown as the search condition items, and the user inputs specific values corresponding to the items in accordance with needs. All items are not required to be set as the search condition items specified by the search condition setting unit 30, and inputting a specific value of at least one item, for example, the product number will be enough. The required input item(s) can be appropriately changed depending on the purpose of the search, and if a substitutional product search is not needed, the "substitutional product number" is not required to be input as well. In the search method specifying unit 32, a normal search radio button 32-1, a two-step search radio button 32-2, and a plural-step search radio button 32-3 are provided. Although the search system according to this embodiment also enables normal searches, search processes of plural steps are performed by specifying the two-step search radio button 32-2 or the plural-step search radio button 32-3 by, for example, a mouse click. In the re-search condition item specifying unit 34, the re-search condition item desired to be re-searched based on the search result of the database 16 according to the search condition item set in the search condition setting unit 30 is specified. This embodiment employs, as an example, a case in which a product number is specified as a search condition item in the search condition setting unit 30, and a substitutional product number is re-searched based on the search result; therefore, "substitutional product number" is specified in the re-search condition item specifying unit 34. Note that specification by the re-search condition item specifying unit 34 can be performed by opening a dialog and selecting and specifying an item among them. As a matter of course, the user per se can directly input a necessary re-search condition item. Note that, since item input is not required in the re-search condition item specifying unit when the normal search is selected, input operation therefore can be made non-effective. An all-item all-row combination listing display radio button 36-1 and specified-item one-row combination listing display radio buttons 36-2 and 36-3 are provided in the display method specifying unit 36, and any one of them can be specified as the display method of the search results. When the specified-item one-row combination listing display radio button 36-2 is specified, a specified item(s) to be displayed by the specified-item one-row combination listing display of the search results can be arbitrarily selected by the user from a comparative display item specifying list 38 in accordance with needs. Also, when the specified-item one-row combination listing display radio button 36-3 is specified, as noted in the parentheses, a specified item(s) to be displayed by the specified-item one-row combination listing display of the original information search result which is the initially searched search result and the final search result after a plural-step search can be arbitrarily selected in accordance with needs. When the user specifies a necessary item(s) from the comparative display item specifying list 38, the selected and specified item names are displayed in a specified item(s) 40 in the right side; and, with respect to the item name(s) of the specified item(s) 40, the specified-item one-row combination listing display is performed for each search result. Furthermore, a search execution button 42 and a clear button 44 are disposed in an upper part on the search operation screen 28.

FIG. 5 is an explanatory drawing of an internal configuration of the database 16 of FIG. 2, wherein the registered data of the database 16 includes product numbers, manufacturer product names, manufacturer brevity codes, management categories, standard ranks, unit prices, and substitutional product numbers.

FIGS. 6A to 6D are explanatory drawings of the all-item all-row combination listing display of the search results obtained by specifying the two-step search and the plural-step search by the display method specifying unit 36 of FIGS. 4A and 4B. FIG. 6A is an all-item all-row combination listing display example 46 based on search results of the two-step search, wherein, with respect to the search results, while counter values 48 is serving as indexes indicating the search step numbers, all of the items obtained from the search results such as product numbers 50, management categories 52, unit prices 54, and substitutional product numbers 56 are displayed in the row direction. All of the items in the row direction corresponding to the counter value 48=1 are an original information record 58 according to the initial search result, wherein the original information record 58 is a first search result obtained by specifying "CA46740-0002" as the product number in the search condition setting unit 30 in the search operation screen 28 of FIGS. 4A and 4B, also clicking the two-step search radio button 32-2 in the search method specifying unit 32, furthermore specifying the "substitutional product number" in the re-search condition item specifying unit 34, and furthermore specifying the all-item all-row combination listing display radio button 36-1 in the display method specifying unit 36. With respect to the original information record 58 according to the first search, "CA46740-0020" is returned as a value of the substitutional product number 56; therefore, a second search is performed by specifying this value "CA46740-0020" as a search condition item in the next search, and a substitutional product information record 60 is obtained as a second search result. When looking at the substitutional product information record 60 which is serving as the second search result, the detailed information of the value "CA46740-0020" of the substitutional product number 56 of the original information record 58, which is the first search result, is obtained as the search result. Then, it is found from the second search result that the part of the product number "CA46740-0002" has a substitutional product of the product number "CA46740-0020", and that the product number "CA46740-0020" which is a substitutional product of the first search result further has "CA46740-0025" as a substitutional product. Herein, the management category 52 shows management categories/recommendation ranks of parts, wherein "rank A" is the highest recommendation rank, and "rank B" is the next. Therefore, evaluation for selecting a more beneficial part from the search results can be readily performed by the user by looking at the management category 52 in the search results.

FIG. 6B is an all-item all-row combination listing display example of a search result obtained by specifying the plural-step search, wherein, in an all-item all-row combination listing display list 65, as well as the case of the two-step search of FIGS. 6A to 6D, all the items of the counter values 48 indicating the number of searched times, the product numbers 50, the management categories 52, the unit prices 54, the substitutional product numbers 56, etc. are arranged in the row direction; and, in the vertical direction, in this example, the search results of four times, i.e., the original information record 58 according to the first search, the substitutional information record 60 according to a re-search, a substitutional information record 62 according to a re-re-search, and a substitutional information record 64 according to a re-re-re-search are disposed in the column direction in the searched order. Herein, the first original information record 58 and the second substitutional product information record 60 are same as those of the all-item all-row combination listing display of the two-step search of FIG. 6A; however, in the plural-step search, since searches are repeated until the value of the "substitutional product number" which is specified as the re-search condition item is finally no longer returned, no value of the substitutional product number is returned in a fourth search, wherein the search is terminated. In other words, in the example of FIG. 6B, all the substitutional products stored in the database in relation to "CA46740-0002" which has been searched in the initial search are searched. Herein, the search condition item in the third search is "CA46740-0025" of the substitutional product number 56 which has been obtained in the second search. Also, the search condition item of the fourth search is "CA46740-0100" of the substitutional product number 56 which has been obtained in the third search. When the all-item all-row combination listing display shown in FIG. 6B is performed, the user can see the information relevant to all the substitutional products in a list, and is enabled to compare parts more easily.

FIG. 6C is a display list 47 of a case in which the "normal search" is performed by clicking the normal search radio button 32-1 as the search method specification 32 in the search operation screen 28 of FIGS. 4A and 4B.

Furthermore, FIG. 6D is an all-item all-row combination listing display list 46-1 of a case in which the "two-step search" is performed by clicking the two-step search radio button 32-2 as the search method specification 32 in the search operation screen 28 of FIGS. 4A and 4B; however, this is a case in which the product number "CA46740-0100" which has been searched in the first time does not have any substitutional product, wherein the process is terminated without performing the second search since the substitutional product number 56 is not obtained as data, and merely the first search result is displayed.

FIGS. 7A to 7C are explanatory drawings of the specified-item one-row combination listing display of the search results obtained by specifying the two-step search and the plural-step search. Herein, a case in which four items, for example, "product number", "management category" "unit price", and "property" are specified as the specified items is employed as an example.

FIG. 7A is a specified-item one-row combination listing display list 66 obtained by the search results of a case in which the two-step search radio button 32-2 and the specified-item one-row combination listing display radio button 36-2 of FIGS. 4A and 4B are clicked, wherein an original information list 68 obtained as a first search result and a substitutional product information list 70 obtained in a second search are disposed in the row direction in the searched order. Each of the original information list 68 and the substitutional product information list 70 is a list in which the four items "product number", "management category", "unit price", and "property" which are the specified items are arranged in one row. Such specified-item one-row combination listing display list 66 is a all-row one-row display list in which all the items obtained from search results are basically disposed in the row direction; however, when all the items are displayed, it is hard to perform comparative judgment between the search results, therefore, the specified items can be appropriately selected by user customize so as to narrow down the specified items to display the search results.

FIG. 7B is an explanatory drawing of a specified-item one-row combination listing display 76-1 obtained from the search results of a case in which the plural-step search radio button 32-3 and the specified-item one-row combination listing display radio button 36-2 of FIGS. 4A and 4B are clicked. In FIG. 7B, in the specified-item one-row combination listing display list 76, the original information list 68 according to a first search result, the substitutional product information list 70 according to a second search result, a substitutional product information list 72 according to a third search result, and a substitutional product information list 74 according to a fourth search result are arranged in one row with respect to the specified items, and these are disposed in the row direction in the searched order.

FIG. 7C is an explanatory drawing of a specified-item one-row combination listing display 76-2 obtained from the search results of a case in which the plural-step search radio button 32-3 and the specified-item one-row combination listing display radio button 36-3 of FIGS. 4A and 4B are clicked. In FIG. 7C, in the specified-item one-row combination listing display list 76-2, the original information list 68 according to a first search result and the substitutional product information list 74 according to a fourth search result which is the final search result are arranged in one row with respect to the specified items, and these are disposed in the row direction in the searched order. In this case, the substitutional product information lists 70 and 72, which are information obtained in an intermediate course in the plural-step search of FIG. 7B, are deleted. As a result, the latest substitutional product information 74 registered in the database 16 with respect to the product of the original information 68 which has been initially searched can be obtained, and the operation efficiency of the cases in which the latest substitutional product is to be searched can be improved.

Note that in the example of FIG. 7C, when the original information and the final search result are to be displayed in one row, the information of the latest substitutional product is obtained as the final search result since the substitutional product numbers of the search results of the second to fourth times are searched in the registered order of the database like "CA46740-0020", "CA46740-0025", and "CA46740-0100" of FIG. 7B. However, sometimes the search results of plural steps are not always in the registered order of the database; therefore, in such cases, the search results of the plural steps can be sorted in the registered order such that the final search result after sorting, i.e., the latest information is displayed in one row together with the original information.

Herein, the all-item all-row combination listing list display of FIGS. 6A to 6D are suitable for, for example, the cases in which a substitutional product is to be selected by comprehensive comparative judgment without narrowing down particular items, for example, when the user determines a substitutional product, since all of the search results searched in plural steps are displayed in a list. On the other hand, the specified-item one-row combination listing display of FIGS. 7A to 7C are suitable for, for example, the cases in which the user determines a substitutional product from a particular view point such as a price-emphasized or a performance-emphasized view point.

Figure 8A:
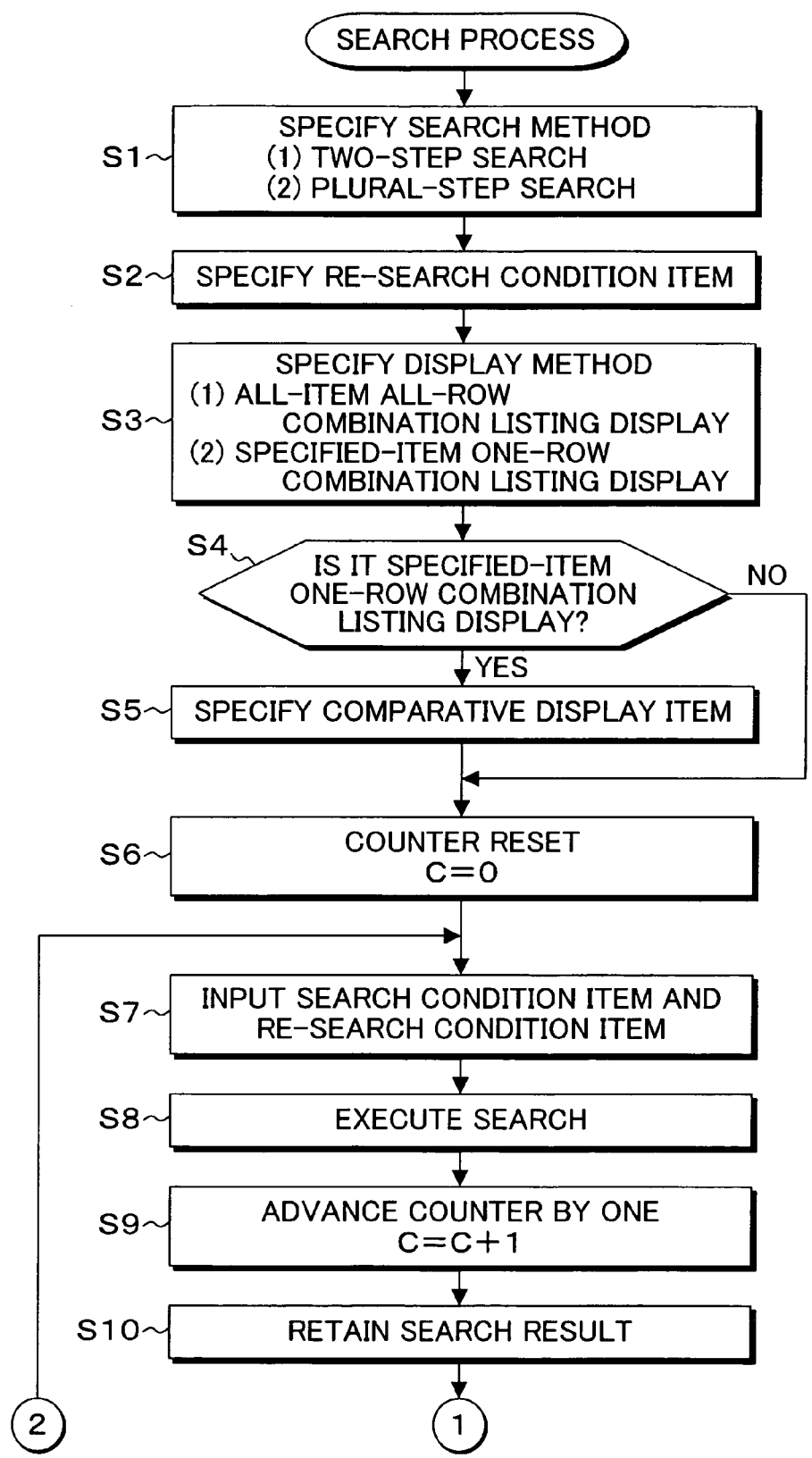
FIG. 8A is a flow chart of a search process according to the present invention.
Figure 8B:
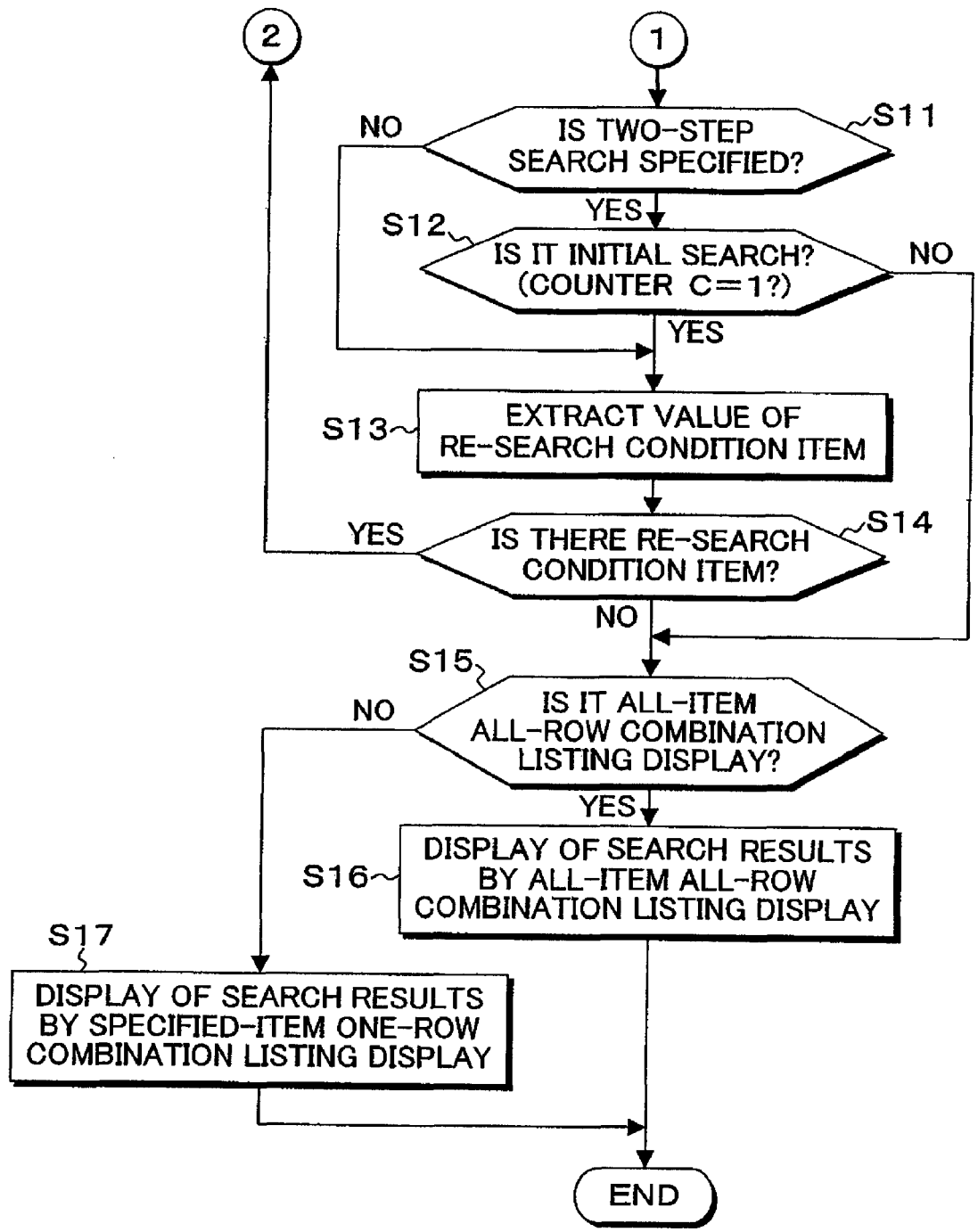
FIG. 8B is a flow chart of the search process which is subsequent to FIG. 8A and according to the present invention.

FIGS. 8A and 8B are flow charts of a search process according to this embodiment, which will be as described below when described with reference to FIG. 3. The flow charts of FIG. 8A and FIG. 8B represent processing contents of the database search program according to this embodiment. First, in step S1, any one of the normal search, the two-step search, and the plural-step search is specified as the search method. When the normal search is selected, input of the re-inspection condition item, etc. is not required, and a normal search process is executed. Note that, since conventional methods can be appropriately utilized for the normal search process per se, description thereof will be omitted in FIG. 8A. The re-search condition item is next specified in step S2. Subsequently, in step S3, the all-item all-row combination listing display or the specified-item one-row combination listing display is specified as the display method. When the specified-item one-row combination listing display is specified herein, this is determined in step S4, and it proceeds to step S5 in which the comparative display item(s) to be used in the specified-item one-row combination listing display is specified. In the case of the all-item all-row combination listing display, the process of step S5 is skipped. Subsequently, in step S6, a counter C which stores the value of the number of search times is reset to C=0; in step S7, search condition item(s) specified in the search condition setting unit 30 of FIGS. 4A and 4B and the re-search condition item(s) specified in the re-search condition item specifying unit 34 are input; and, in step S8, a first search is executed. Subsequently, in step S9, the counter C is advanced by one such that C=C+1. Subsequently, the search result is retained in step S10. Next, in step S11, whether the two-step search is specified or not is checked; and if the two-step search is specified, whether it is the initial search or not, that is, whether the counter C=1 or not is checked in step S12. If it is the initial search, in step S13, the value of the set re-search condition item is extracted from the search result which has been retained in step S10. In step S14, when the value of the re-search condition item is extracted, the process returns to step S7 in which the value of the re-search condition item extracted from the search result is automatically input as a new search condition item, and the same re-search condition item is automatically input; and a second search is executed in step S8. Subsequently, in step S9, the counter C is advanced by one, and the search result is retained in step S10. Subsequently, specification of the two-step search is determined in step S11, and the process proceeds to step S12; however, since the value of the counter at this point is C=2, and it is not the initial search, the process proceeds to step S15 of FIG. 8B. In step S15, whether the all-item all-row combination listing display is specified or not is checked; and, if it is the all-item all-row combination listing display, the process proceeds to step S15 in which display of the search results by the all-item all-row combination listing display is performed with respect to the search results of the two-step search, for example, like that shown in FIG. 6A. Meanwhile, if it is not the all-item all-row combination listing display in step S15, that is, if it is the specified-item one-row combination listing display, the process proceeds to step S17 in which display of the search results by the specified-item one-row combination listing is performed with respect to the search results of the two-step search as shown in FIG. 7A. Meanwhile, when specification of the plural-step search is determined in step S11, the process of step S12 is skipped, and the search process from step S7 is repeated until no re-search condition is detected from the search result in step S14. When no re-search condition can be searched in step S14, as well as the case of the two-step search, the process proceeds to step S15 of FIG. 8B wherein, if the all-item all-row combination listing display is specified, in step S16, display of the search results by the all-item all-row combination listing is performed as shown in FIG. 6B. Also, when the specified-item one-row combination listing display is specified, the process proceeds from the step S15 to S17, wherein display of the search results by the specified-item one-row combination listing is performed with respect to the search results of the plural-step search as shown in FIG. 7B or FIG. 7C. Note that, although the above described embodiment employs a part search as an example, the present invention is not limited thereto, and can be applied to appropriate search systems without change. Moreover, although the above described embodiment employs specification of two-step searches and searches of plural steps of more than two are employed as examples of search methods, the number of search steps may be configured to be arbitrarily specified in accordance with needs. Moreover, in the above described embodiment, the user can perform customizing by specifying comparative display items only for the specified-item one-row combination listing display; however, also for the all-item all-row combination listing display such as that shown in FIGS. 5A and 5B, the user can enable specified-item all-row combination listing display by specifying comparative display items. Moreover, the present invention includes appropriate modifications that do not impair the objects and advantages thereof, and is not limited by the numerical values shown in the above described embodiment.

What is claimed is:

1. A database search method comprising:
   a search condition setting step performed by a search condition setting unit of a computer for setting search condition items containing an item value used in an initial search are specified;
   a search condition specifying step performed by a search condition specifying unit of a computer for specifying a search condition item containing an item value and a substitutional product as a re-search condition item, at the same time, and a search method is specified among a normal search, a two-step search and a plural-step search;
   a search processing step performed by a search processing unit of the computer for extracting an item value corresponding to the specified re-search condition item from the search result of a database according to the specified search condition item, and repeating a search of the database recursively by using the extracted item value as a new item value of the search condition item without specifying a new re-search condition item based on a search result; and
   a search result display step performed by a search result display unit of the computer for displaying the search results and the re-search results obtained in the search processing step in a list;
   wherein the search condition specifying step is performed before a first search of the search processing step; and
   wherein in the search condition specifying step, an arbitrary search step number is specified as a search method in a plural-step search, and a display type of the search results is specified.

2. The database search method according to claim 1, wherein:
   each of the search results obtained in a plural-step search in the search processing step includes plural items; and
   the search result display step employs all-item all-row combination listing display in which, based on specification of a display type in the search condition specifying step, all the items of each of the search results according to the plural-step search are disposed in a row direction, and the search results are disposed in a column direction in a searched order.

3. The database search method according to claim 1, wherein:
   each of the search results obtained in a plural-step search in the search processing step is comprised of plural items; and
   the search result display step employs specified-item one-row combination listing display in which, based on specification of a display type and a display item in the search condition specifying step, the specified display item is extracted from the search results obtained in the plural-step search, and disposed in a row direction in a searched order.

4. The database search method according to claim 1, wherein:
   each of the search results obtained in a plural-step search in the search processing step is comprised of plural items; and
   the search result display step employs specified-item one-row combination listing display in which, based on specification of a display type and a display item in the search condition specifying step, the specified display item is extracted from the initially searched search result and the final search result after the plural-step search, and disposed in a row direction in a searched order.

5. The database search method according to claim 1, wherein:
   in the search condition specifying step, a product is specified as the search condition item;
   in the search processing step, the substitutional product is extracted from the search result according to specification of the product, and a search in which the substitutional product serves as a new search condition item is repeated until no substitutional product is extracted from the search result; and,
   in the search result display step, the product and the substitutional product searched in the search processing step are displayed in the list.

6. A non-transitory computer-readable recording medium which stores a database search program, the database search program causing a computer to execute:
   a search condition setting step of setting search condition items containing an item value used in an initial search are specified;
   a search condition specifying step of specifying a search condition item containing an item value and a substitutional product as a re-search condition item, at the same time, and a search method is specified among a normal search, a two-step search and a plural-step search;
   a search processing step of extracting an item value corresponding to the specified re-search condition item from the search result of a database according to the specified search condition item, and repeating a search of the database recursively by using the extracted item as a new item value of the search condition item without specifying a new re-search condition item based on a search result; and
   a search result display information generating step of generating display information for displaying the search results and the re-search results obtained in the search processing step in a list;
   wherein the search condition specifying step is performed before a first search of the search processing step, and
   wherein in the search condition specifying step, an arbitrary search step number is specified as a search method in a plural-step search, and a display type of the search results is specified.

7. The non-transitory recording medium according to claim 6, wherein:
   each of the search results obtained in a plural-step search in the search processing step includes plural items; and,
   in the search result display information generating step, all-item all-row combination listing display information in which, based on specification of a display type in the search condition specifying step, all the items of each of the search results according to the plural-step search are disposed in a row direction, and the search results, in which all the items are disposed in rows, are disposed in a column direction in a searched order is generated.

8. The non-transitory recording medium according to claim 6, wherein:
   each of the search results obtained in a plural-step search in the search processing step is comprised of plural items; and
   the search result display step employs specified-item one-row combination listing display in which, based on specification of a display type and a display item in the search condition specifying step, the specified display item is extracted from the search results obtained in the plural-step search, and disposed in a row direction in a searched order.

9. The non-transitory recording medium according to claim 6, wherein:
   each of the search results obtained in a plural-step search in the search processing step is comprised of plural items; and
   the search result display step employs specified-item one-row combination listing display in which, based on specification of a display type and a display item in the search condition specifying step, the specified display item is extracted from the initially searched search result and the final search result after the plural-step search, and disposed in a row direction in a searched order.

10. The non-transitory recording medium according to claim 6, wherein:
    in the search condition specifying step, a product is specified as the search condition item;
    in the search processing step, the substitutional product is extracted from the search result according to specification of the product, and a search in which the substitutional product serves as a new search condition item is repeated until no substitutional product is extracted from the search result; and,
    in the search result display generating step, the display information for displaying the product and the substitutional product searched in the search processing step in the list is generated.

11. A database search apparatus includes a non-transitory computer-readable recording medium which stores a database search program, the database search apparatus comprising:
    a search condition setting unit for setting search condition items containing an item value used in an initial search are specified;
    a search condition specifying unit for specifying a search condition item containing an item value and a substitutional product as a re-search condition item, at the same time, and a search method is specified among a normal search, a two-step search and a plural-step search;
    a search processing unit for extracting an item value corresponding to the re-search condition item from the search result of a database according to specification of the search condition item, and repeating a search of the database recursively wherein the extracted item value serves as a new item value of the search condition item without specifying a new re-search condition item based on a search result; and
    a search result display unit for displaying the search results obtained in the search processing unit in a list;
    wherein the search condition specifying unit is performed before a first search of the search processing unit, and
    wherein in the search condition specifying unit, an arbitrary search step number is specified as a search method in the plural-step search, and a display type of the search results is specified.

12. The database search apparatus according to claim 11, wherein:
    the search condition specifying unit further specifies a search type corresponding to the number of search steps, and specifies a display type of the search results.

13. A database search method performed by a computer comprising:
    setting search condition items containing an item value used in an initial search are specified;
    searching a database by using a specified search condition item containing an item value and a substitutional product as a re-search condition item, at the same time, specifying a search method among a normal search, a two-step search and a plural-step search, and obtaining a search result that contains one or more item values;

determining whether the search result of the database according to the specified search condition item contains an item value corresponding to a substitutional product as a re-search condition item which has been specified with the search condition item in advance;

if the item value corresponding to the re-search condition item is included in the search result, extracting the item value from the search result;

performing a re-search of the database recursively by using the extracted item value as a new item value of the search condition item without specifying a new re-search condition item based on a search result; and displaying the search results and the re-search results in a list;

wherein in the search condition item, the item value are specified once before the database is searched first, and wherein an arbitrary search step number is specified as a search method in a plural-step search, and a display type of the search results is specified.

14. The database search method according to claim 13, wherein each of the obtained search results contains a plurality of items, the method further comprising:

employing a specified-item one-row combination listing display in which, based on the specified display type and the specified display item, the specified display item is extracted from the initially searched search result and the final search result, and is disposed in a row direction in a searched order.

* * * * *